(12) United States Patent
Arrabi et al.

(10) Patent No.: US 10,049,487 B2
(45) Date of Patent: Aug. 14, 2018

(54) IDENTIFYING DUPLICATE INDICES IN AN INPUT INDEX STREAM

(71) Applicant: Advanced Micro Devices, Inc., Sunnyvale, CA (US)

(72) Inventors: Saad Arrabi, Orlando, FL (US); Mangesh P. Nijasure, Orlando, FL (US); Todd Martin, Orlando, FL (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 15/360,395

(22) Filed: Nov. 23, 2016

(65) Prior Publication Data

US 2018/0144536 A1     May 24, 2018

(51) Int. Cl.
*G06T 15/00*     (2011.01)
*G06T 15/80*     (2011.01)

(52) U.S. Cl.
CPC ............ *G06T 15/005* (2013.01); *G06T 15/80* (2013.01)

(58) Field of Classification Search
CPC .... G09G 5/377; G09G 5/363; G09G 2360/06; G09G 2360/122; G06T 11/40; G06T 15/005
USPC ......................................................... 345/419
See application file for complete search history.

(56) References Cited

U.S. PATENT DOCUMENTS

| 8,587,581 | B2* | 11/2013 | Molnar | G06T 15/005 345/419 |
| 8,810,592 | B2* | 8/2014 | Hakura | G06T 15/005 345/419 |
| 8,928,679 | B2* | 1/2015 | Carroll | G06T 1/20 345/418 |
| 9,123,153 | B2* | 9/2015 | Carroll | G06T 17/20 |

OTHER PUBLICATIONS

Badiozamany, Sobhan, and Tore Risch. "Scalable ordered indexing of streaming data." In ADMS@ VLDB, pp. 57-67. 2012.*

* cited by examiner

*Primary Examiner* — Phu K Nguyen
(74) *Attorney, Agent, or Firm* — Volpe and Koenig, P.C.

(57) ABSTRACT

Techniques for removing duplicate indices from an index stream are disclosed. The techniques involve dividing the indices into chunks. For any particular chunk, the techniques involve examining each index in the chunk to determine whether a "match" exists for that index within a reuse depth sliding window. The reuse depth sliding window includes a fixed number of indices immediately prior to the index being examined for a match. If a match exists, then the index is marked as non-unique and is assigned a position value equal to the position value of the matching index. If a match does not exist, then the index is marked as unique and assigned the next available position value for the chunk. After assigning position values to indices in a chunk, the indices in the chunk are transmitted to a vertex shader stage for processing in the order indicated by the position values.

20 Claims, 6 Drawing Sheets

IDENTIFYING DUPLICATE INDICES IN AN INPUT INDEX STREAM

TECHNICAL FIELD

The disclosed embodiments are generally directed to graphics processing, and, in particular, to identifying duplicate indices in an input index stream.

BACKGROUND

Hardware for rendering three-dimensional graphics accepts input that specifies primitives to be drawn to a screen. At least part of this input includes indices that refer to vertices that specify the shape, location, and attributes of a primitive. These indices typically need to be converted from a user-provided format to a format that is more suitable for use on graphics hardware. Graphics hardware is typically massively parallel because the act of rendering involves large numbers of similar but independent operations (e.g., calculating color values for different pixels, transforming positions of different vertices, or the like). To be able to provide the massively parallel processing units with sufficient load to be highly utilized, the input indices should be processed quickly and efficiently.

BRIEF DESCRIPTION OF THE DRAWINGS

A more detailed understanding may be had from the following description, given by way of example in conjunction with the accompanying drawings wherein.

DETAILED DESCRIPTION

The present disclosure is directed to techniques for removing duplicate indices from a stream of input indices for processing by a graphics pipeline. The techniques involve dividing the indices into chunks. For any particular chunk, the techniques involve examining each index in the chunk to determine whether a "match" exists for that index within a reuse depth sliding window. The reuse depth sliding window includes a fixed number of indices immediately prior to the index being examined for a match. If a match exists, then the index is marked as non-unique and is assigned a position value equal to the position value of the matching index. If a match does not exist, then the index is marked as unique and assigned the next available position value for the chunk. Position values are assigned as monotonically increasing numerals starting at 0 for the first unique index in the chunk and increasing for each subsequent unique index in the chunk.

Matches can occur in the same chunk or in previous chunks. A match occurs if the index value is the same as an index value of an index that is in the chunk and in the sliding window, except that a match does not occur if the index with the same value is in a preceding chunk and is marked as non-unique.

After assigning position values to indices in a chunk, the indices in the chunk are transmitted to a vertex shader stage for processing in the order indicated by the position values. Position values seen multiple times indicate duplicate indices. Only the index associated with the first such position value is transmitted to the vertex shader stage. The other indices with the same position value are skipped. In this way, duplicate indices are removed from the indices output to the vertex shader.

Figure 1:
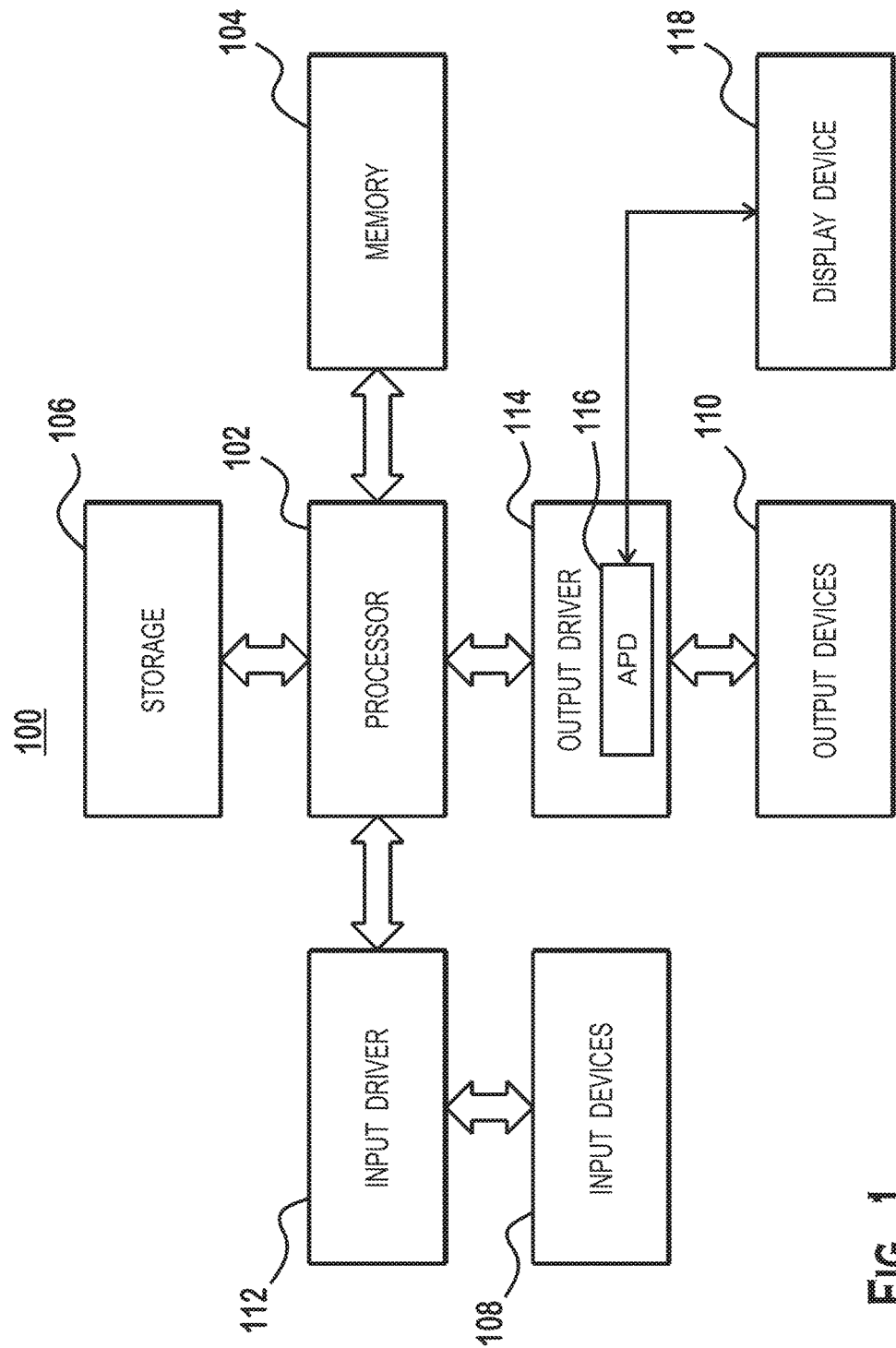
FIG. 1 is a block diagram of an example device in which one or more disclosed embodiments may be implemented.

FIG. 1 is a block diagram of an example device 100 in which one or more aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 also includes input drivers 112 and output drivers 114 that drive input devices 108 and output devices 110, respectively. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core may be a CPU or a GPU. The memory 104 is located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input drivers 112 communicate with the processor 102 and the input devices 108, and permit the processor 102 to receive input from the input devices 108. The output drivers 114 communicate with the processor 102 and the output devices 110, and permit the processor 102 to send output to the output devices 110. The output drivers 114 include an accelerated processing device (APD) 116 which is coupled to a display device 118. The APD 116 is configured to accept compute commands and graphics rendering commands from processor 102, to process those compute and graphics rendering commands, and to provide pixel output to display device 118 for display.

The APD 116 includes one or more parallel processing units configured to perform computations in accordance with a single-instruction-multiple-data ("SIMD") paradigm. However, functionality described as being performed by the APD 116 may also be performed by processing devices that do not process data in accordance with a SIMD paradigm.

Figure 2:
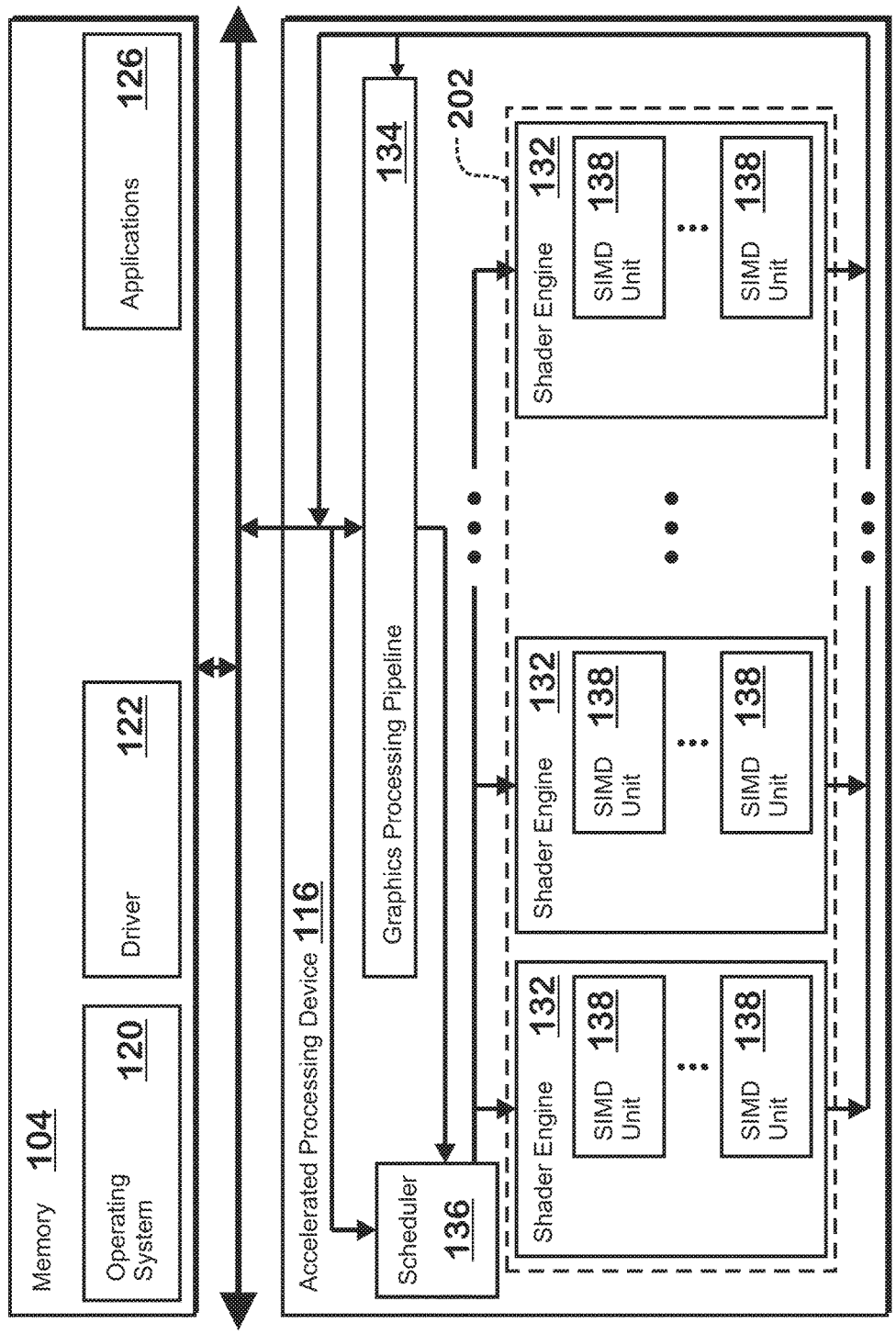
FIG. 2 is a block diagram of an accelerated processing device, according to an example.

FIG. 2 is a block diagram of an accelerated processing device 116, according to an example. The processor 102 maintains, in system memory 104, one or more control logic modules for execution by the processor 102. The control logic modules include an operating system 120, a driver 122, and applications 126. These control logic modules control various aspects of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. The driver 122 also includes a just-in-time compiler that compiles shader programs for execution by processing components (such as the SIMD units 138 discussed in further detail below) of the APD 116.

The APD 116 executes commands and programs for selected functions, such as graphics operations and non-graphics operations, which may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related (or not related) to graphics operations, such as operations related to video, physics simulations, computational fluid dynamics, or other tasks, based on commands that are received from the processor 102 or that are not part of the "normal" information flow of a graphics processing pipeline 134.

The APD 116 includes shader engines 132 (which may collectively be referred to herein as "programmable processing units 202") that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by individual lanes, predication of lanes corresponding to control flow paths not currently being executed, and serial execution of different control flow paths, allows for arbitrary control flow to be followed.

The basic unit of execution in shader engines 132 is a work-item. Each work-item represents a single instantiation of a program that is to be executed in parallel in a particular lane. Work-items can be executed simultaneously as a "wavefront" on a single SIMD unit 138. Multiple wavefronts may be included in a "work group," which includes a collection of work-items designated to execute the same program. A work group can be executed by executing each of the wavefronts that make up the work group. The wavefronts may be executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different shader engines 132 and SIMD units 138. Scheduling involves assigning wavefronts for execution on SIMD units 138, determining when wavefronts have ended, determining when wavefronts have stalled and should be swapped out with other wavefronts, and performing other scheduling tasks.

The parallelism afforded by the shader engines 132 is suitable for graphics related operations such as pixel value calculations, vertex transformations, and other graphics operations. A graphics processing pipeline 134 which accepts graphics processing commands from the processor 102 thus provides computation tasks to the shader engines 132 for execution in parallel.

The shader engines 132 are also used to perform computation tasks not related to graphics or not performed as part of the "normal" operation of a graphics processing pipeline 134 (e.g., custom operations performed to supplement processing performed for operation of the graphics processing pipeline 134). An application 126 or other software executing on the processor 102 transmits programs (often referred to as "compute shader programs") that define such computation tasks to the APD 116 for execution.

Figure 3:
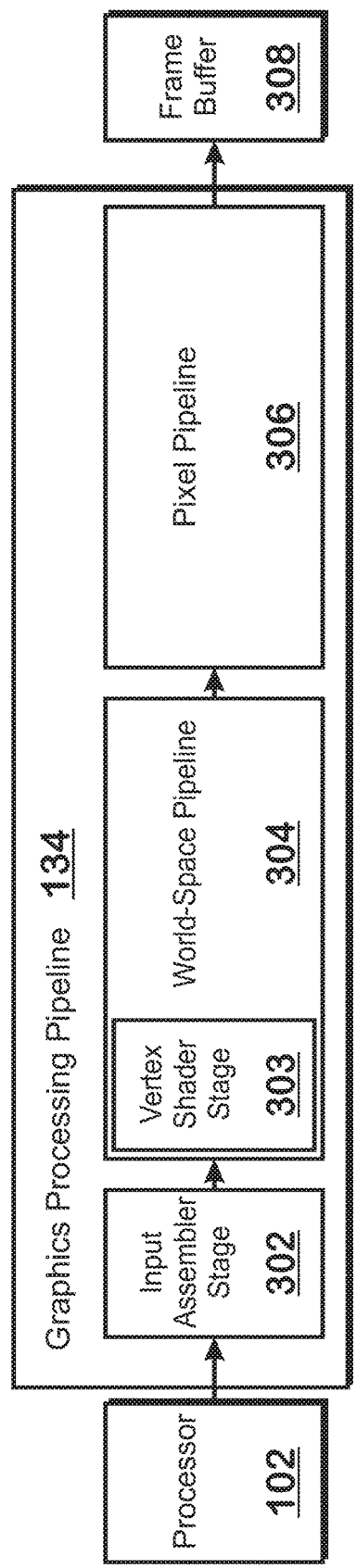
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes an input assembler stage 302, a world-space pipeline 304, and a pixel pipeline 306. The world-space pipeline includes a vertex shader stage 303 and other stages not explicitly illustrated. The input assembler stage 302 processes and formats input received from the processor 102 for processing by the graphics processing pipeline 134. The world-space pipeline 304 performs vertex and primitive manipulation, converting objects defined in three-dimensional world-space to triangles defined in screen space. The pixel pipeline 306 processes the triangles defined in screen space to generate pixel colors for output to a frame buffer 308. Each of the input assembler stage 302, the world-space pipeline 304, and the pixel pipeline 306 can be implemented as a combination of hardware (including fixed function and programmable hardware) and software, as all hardware (including all fixed function hardware, all programmable hardware, or a combination thereof), or entirely as software executing on a hardware processor.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers.

The world-space pipeline 304 performs functionality for converting the input received from a processor 102 into a form more amenable to rendering into screen pixels. More specifically, the world-space pipeline 304 performs vertex shading functions, in the vertex shader stage 303, optional tessellation functions if tessellation is enabled, and optional geometry shading functions if geometry shading is enabled.

The vertex shader stage 303 performs vertex shading by performing various per-vertex operations such as transformations, skinning, morphing, and per-vertex lighting. Transformation operations may include various operations to transform the coordinates of the vertices. These operations may include one or more of modeling transformations, viewing transformations, projection transformations, perspective division, and viewport transformations. Herein, such transformations are considered to modify the coordinates or "position" of the vertices on which the transforms are performed. Other operations of vertex shading may modify attributes other than the coordinates. Vertex shading is implemented partially or fully as vertex shader programs to be executed on one or more shader engines 132. In some examples, the vertex shader programs are provided by the processor 102 and are based on programs that are pre-written by a computer programmer. The driver 122 compiles such programs to generate the vertex shader programs having a format suitable for execution within the shader engines 132. In other examples, the vertex shader programs are provided by the driver 122 directly, are stored within the APD 116, or are provided through any other technically feasible means.

Tessellation converts simple primitives into more complex primitives by subdividing the primitives. Tessellation involves generating a patch for the tessellation based on an input primitive, generating a set of samples for the patch, and calculating vertex positions for the vertices corresponding to the samples for the patch. Tessellation can be performed partially or fully by shader programs executed on the programmable processing units 202.

Geometry shading performs vertex operations on a primitive-by-primitive basis. A variety of different types of operations can be performed via geometry shading, including operations such as point sprite expansion, dynamic particle system operations, fur-fin generation, shadow volume generation, single pass render-to-cubemap, per-primitive material swapping, and per-primitive material setup. Operations for geometry shading may be performed by a shader program that executes on the programmable processing units 202.

The world-space pipeline 304 outputs primitives (typically triangles) to the pixel pipeline 306 for pixel generation and eventual writing to the frame buffer 308. The contents of the frame buffer 308 are read out to be displayed on the display device 118. The pixel pipeline 306 implements rasterization and pixel shading.

Rasterization involves determining which screen pixels (or sub-pixel samples) are covered by a particular primitive. Pixel shading involves determining output values for screen pixels based on primitives generated in the world-space pipeline 304 and the results of rasterization. Pixel shading may include applying textures from a texture memory. Operations for pixel shading may be performed by one or more shader programs that execute on the programmable processing units 202. After rasterization and shading, the pixel pipeline 306 writes results to the frame buffer 308 for display on the display device 118.

One task of the input assembler stage 302 is to identify and remove duplicate indices in a stream of input indices received from the processor 102. The indices are references to vertices that are stored in a vertex buffer. For this analysis by the input assembler stage 302, indices are used, instead of the vertices that the indices refer to, because indices are smaller than vertices and require fewer resources (e.g., storage elements, wires, or the like) to be processed.

The reason that duplicate indices are removed is that once the vertex referenced by a particular index is processed by the vertex shader stage 303, that vertex does not need to be shaded again. Thus if the input assembler stage 302 sent indices to the vertex shader stage 303 multiple times, the vertex shader stage 303 would have to perform extra work to determine that the particular vertex was already shaded or would otherwise have to ensure that the vertex is correctly processed.

Identification of duplicate indices is complicated by the fact that indices can include special index values called "reset indices." Reset indices are special index values used to interpret the stream of input indices to identify primitives. For example, when interpreting the stream of input primitives as a triangle strip (one of many different types of "primitive topologies"), which is a primitive topology that forms triangles from overlapping sequences of indices (e.g., an input index stream of 0, 1, 2, 3, 4 forms triangle [0, 1, 2], [1, 2, 3], and [2, 3, 4]), the reset index is used to "cut" the strip. "Cutting" the strip causes a break in the overlapping sequence such that primitives are formed on either side of the reset index but not across the reset index. For example, an input index stream of 0, 1, 2, 3, 4, R, 5, 6, 7, 8, 9 produces triangles [0, 1, 2], [1, 2, 3], [2, 3, 4], [5, 6, 7], [6, 7, 8], and [7, 8, 9], but not triangles [3, 4, 5] or [4, 5, 6].

Figure 4:
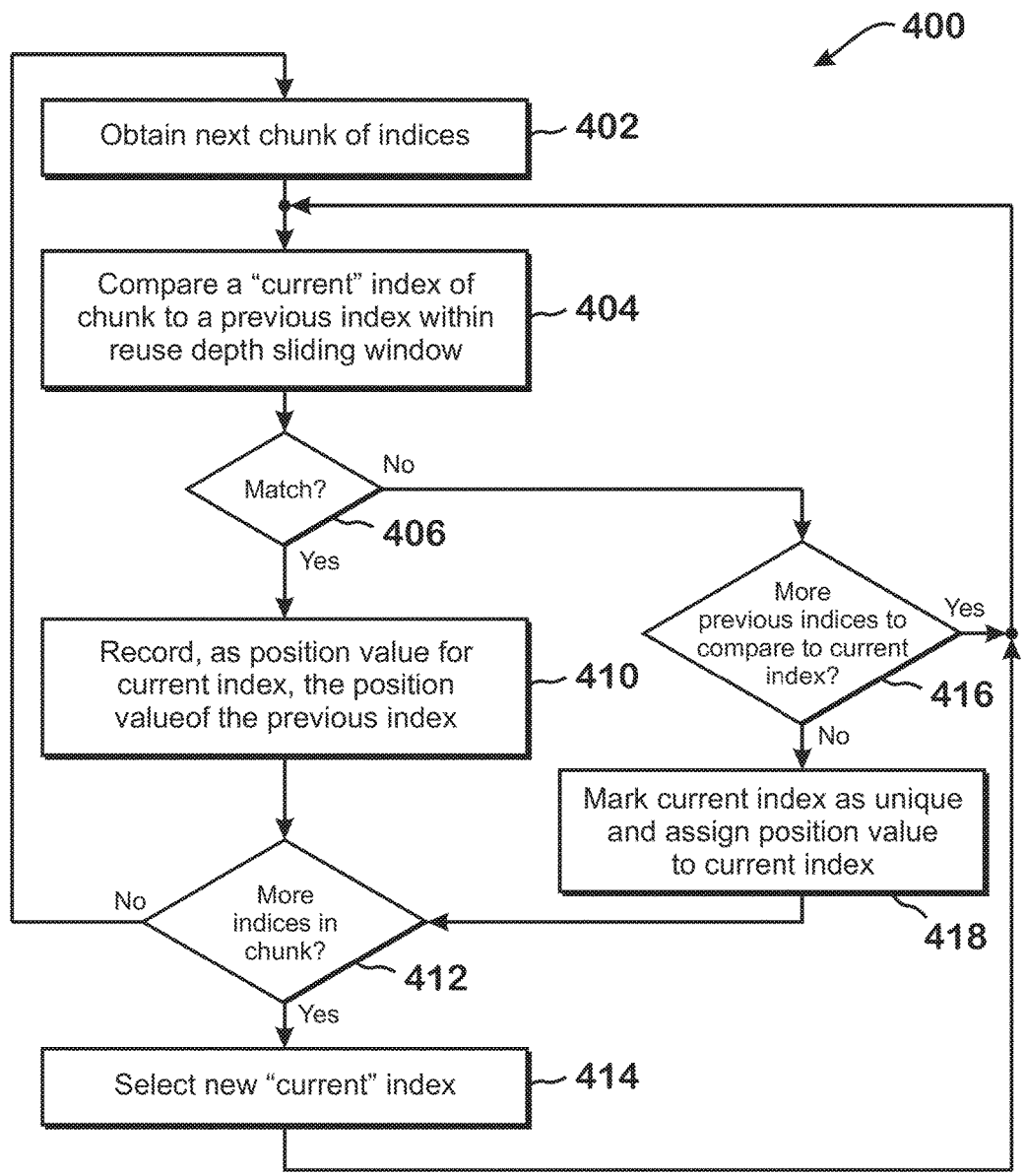
FIG. 4 is a flow diagram of a method for identifying and removing duplicate input indices in a stream of input indices, according to an example.

FIG. 4 is a flow diagram of a method for identifying and removing duplicate input indices in a stream of input indices, according to an example. Although described with respect to the system shown and described with respect to FIGS. 1-3, it should be understood that any system configured to perform the method, in any technically feasible order, falls within the scope of the present disclosure.

The method 400 begins at step 402 where the input assembler stage 302 receives a chunk of indices. A "chunk" is a fixed number of indices retrieved from an input buffer into which indices are written by an entity such as the processor 102 (e.g., at the direction of an application 126, to draw specified graphics primitives). The indices in each chunk are stored in what is referred to as "API order," or the order in which the processor 102 requests that the primitives formed by the indices be drawn.

At step 404, the input assembler stage 302 compares a "current index" of the chunk to a previous index, either in the chunk, or in a previous chunk, that is within a reuse depth sliding window. A "current index" is an index in the chunk that is currently being compared to indices in the reuse depth sliding window for the purpose of identifying duplicate indices. The reuse depth sliding window is a window of indices that are older than the current index, against which the input assembler checks the current index for duplicates. The length of the reuse depth sliding window can be any number of indices, include a number greater or less than the size of a chunk, and extends from the current index towards older indices. The reuse depth sliding window may extend into the previous chunk. To facilitate comparison between a current index and indices in a previous chunk, the input assembler stage 302 can save, instead of discarding, at least some of the indices of the previous chunk. Step 404 involves checking the current index against one index in the sliding window, with checking of additional indices in the reuse depth sliding window occurring in a loop from step 404 to step 412 and back to step 404, which is discussed in further detail below.

At step 406, the input assembler stage 302 determines whether the index in the reuse depth sliding window matches the current index. A match occurs if the value of the current index is equal to the value of the index in the reuse depth sliding window. The "value" of an index is the numerical identifier that the index comprises (i.e., an "index" is a numerical value that references a particular vertex). If the index in the reuse depth sliding window matches the current index, then the method 400 proceeds to step 410 and if the index in the reuse depth sliding window does not match the current index, then the method proceeds to step 416. The reset index does not match with any other index. If the index in the reuse depth sliding window is in the previous chunk, then that index must be unique for a match to occur. If the index in the reuse depth sliding window 503 is in the previous chunk and is not unique, a match does not occur.

At step 410, the input assembler stage 302 records, as a position value for the current index, the position value of the matching index in the reuse depth sliding window. Position values are special values recorded for each index. Within a particular chunk of indices being examined for duplicate indices, position values increase monotonically from 0. For example, the first unique index in a chunk is assigned position value 0, the second unique index in a chunk is assigned position value 1, the third unique index is assigned position value 2, and so on. If the matching index in the reuse depth sliding window is in the previous chunk, then the position value for that index is negative. More specifically, unique indices in the previous chunk are assigned monotonically decreasing position values, starting at −1 with the newest unique index in the previous chunk, and decreasing towards the oldest index in the previous chunk. For example, the newest unique index in the previous chunk is assigned position value −1, the next newest unique index in the previous chunk is assigned position value −2, the next newest unique index in the previous chunk is assigned position value −3, and so on.

At step 412, the input assembler stage 302 determines whether there are additional indices remaining in the chunk for analysis as the "current index." More specifically, the input assembler stage 302 processes one such index in steps 404-412, looping back to step 404 if there are additional indices in the chunk, and continues looping until no more indices are left in the chunk. In some examples, the input assembler stage 302 selects indices from oldest to newest in the chunk. Thus if there are more indices in step 412, the method 400 proceeds to step 414 and selects the next oldest index (i.e., the index immediately subsequent to the index just examined) in the chunk and then returns to step 404. If there are not more indices in step 412, then the entire chunk of indices has been examined and the method returns to step 402 to obtain the next chunk of indices for processing.

Referring back to step 406, if the input assembler stage 302 does not detect a match between the current index of the chunk and the index in the reuse depth sliding window, then the method proceeds to step 416. At step 416, the input assembler stage 302 determines whether there are more indices in the reuse depth sliding window to compare to the current index. In some examples, the input assembler stage 302 searches backwards through the reuse depth sliding window for an index that matches the current index. Thus, in step 416, if there are more indices in the reuse depth sliding window, the input assembler stage 302 selects the next newest index and returns to step 404 to test the current index against this newly selected index in the reuse depth sliding window. In step 416, if there are no more indices in the sliding window, then the current index matches no indices in the sliding window. The method proceeds to step 418 where the input assembler stage marks the current index as unique and assigns the next available monotonically increasing position value to that index (e.g., the first unique index in a chunk gets position value "0," the second unique index in a chunk gets position value "1," and so on. After step 418, the method 400 proceeds to step 412, where the input assembler stage 302 determines whether there are additional indices for examination in the chunk and proceeds to either step 402 (new chunk) or step 404 (new current index in chunk).

At any point after identifying duplicates for an entire chunk, the input assembler stage 302 transmits the indices marked as being unique, in the chunk, to the vertex shader stage 303 for processing in the order indicated by the position values in the position buffer. For example, if there are six indices marked as unique in a chunk, the input assembler stage 302 transmits these indices to the vertex shader stage 303 for processing in the order indicated by the position values for those unique indices. In some examples, transmission to the vertex shader stage 303 for processing includes fetching vertex data based on the indices, buffering the vertices, and packing the vertices for execution together in a wavefront in an efficient manner. Vertices corresponding to indices from two or more different chunks of indices can be packed together for execution in a single wavefront.

Figure 5A:
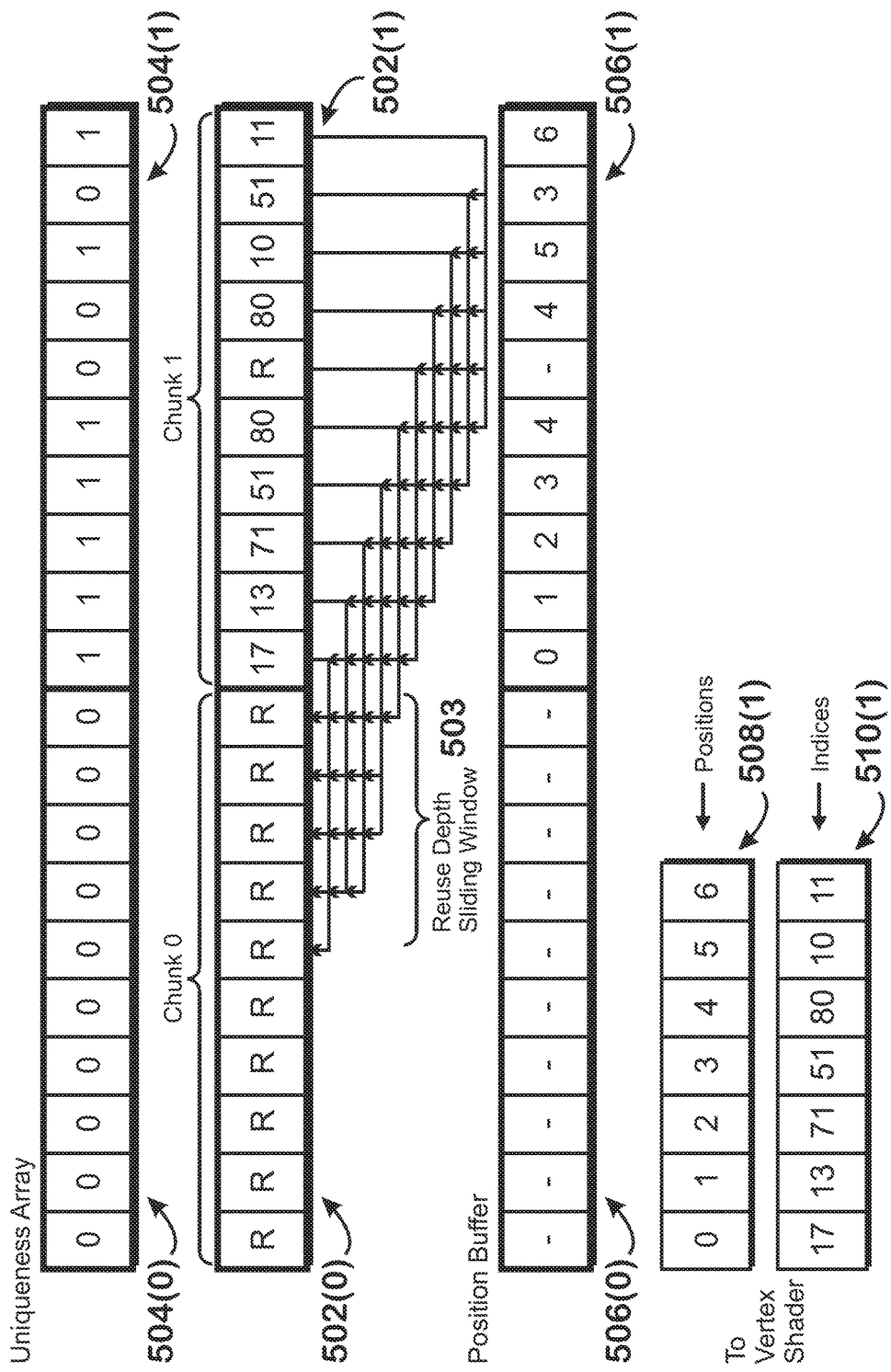
FIGS. 5A and 5B illustrate an example application of the herein-described techniques for discarding duplicate indices.
Figure 5B:
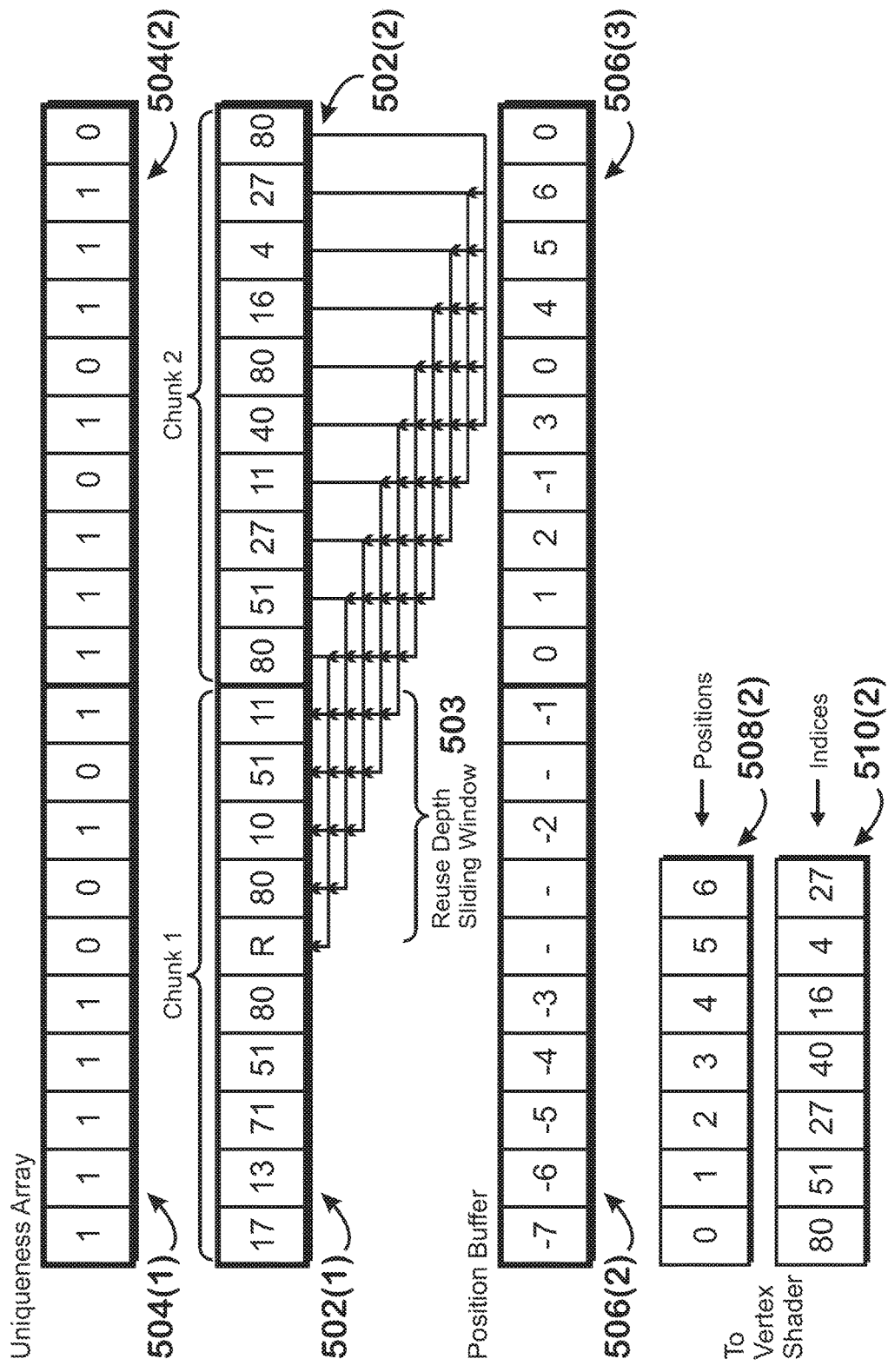

FIGS. 5A and 5B illustrate an example application of the herein-described techniques for discarding duplicate indices. FIG. 5A illustrates a state in which a first chunk of indices is examined for duplicates and FIG. 5B illustrates a state in which a second chunk of indices, immediately subsequent to the first chunk of indices, is examined. The first chunk of indices is padded with the reset index in the "older" direction.

In FIG. 5A, chunk 0 520(0) is the reset index padding (where the reset indices are indicated as "R"). The uniqueness array 504(0) corresponds to the reset index padding of chunk 0 520(0). The uniqueness arrays 504 include entries (shown as rectangles in the uniqueness arrays 504), each of which corresponds to a different index (shown as rectangles) in a chunk 502. Each of the entries of the uniqueness arrays 504 indicate whether the corresponding entry in the corresponding chunk 502 is marked as unique. A value of "1" indicates that the corresponding index is unique and a value of "0" indices that the corresponding index is not unique. All of the reset indices in chunk 0 520(0) are marked as non-unique in FIG. 5A. However, the uniqueness of the reset indices does not matter because reset indices do not match with other indices (step 406 of FIG. 4).

The first chunk to be processed for removal of duplicate indices is chunk 1 502(1). Chunk 1 502(1) contains indices 17, 13, 71, 51, 80, 17, 80, 10, 51, and 11. Reuse depth sliding windows 503 are shown for each of the indices in chunk 1 502(1) and indicate the number of older indices that are to be compared to the index associated with the reuse depth sliding window 503 for identifying duplicate indices. In FIGS. 5A and 5B, the number of older indices in the reuse depth sliding indices is 5 indices. However, this number can be adjusted to any value as desired.

The input assembler stage 302 begins with the oldest index in the first chunk 502(1). The oldest index is the first index with value "17." The input assembler stage 302 checks for a match against indices in the reuse depth sliding window 503 (steps 404-416). Because the indices in the reuse depth sliding window 503 are all reset indices, the input assembler stage 302 determines that no match occurs (step 406). After examining all indices in the reuse depth sliding window 503, the input assembler stage 302 determines that there are no more indices to compare against the first index with value "17" in the reuse depth sliding window 503 and in response, marks the first index with value "17" as unique in the first entry of the uniqueness array 504(1) (step 418—note that this discussion assumes that the uniqueness values for each index begin at value "0" and is modified to value "1" upon detecting that no matches with indices occur in the reuse depth sliding window 503; however, those of skill in the art would recognize that alternative techniques for setting or updating the uniqueness arrays 504 are possible as well).

After marking the current index as unique, the input assembler stage 302 selects a new index for examination (step 414, then returning to step 404 in FIG. 4). The next index is the first index with value "13." The reuse depth sliding window 503 includes four reset indices in chunk 0 502(0) as well as the first index with value "17." Because there is no match in this reuse depth sliding window 503, the input assembler stage 302 marks the first index with value "13" as unique and moves to the next index.

The next index is the first index with value "71." No match for this index exists in the reuse depth sliding window 503, so this is marked as unique as well. The next indices— the first index with value "51" and the first index with value "80" are also marked unique because there is no duplicate index in the reuse depth sliding windows 503 for those indices. Each of the unique vertices is assigned a position value in the position buffer 506(1). Specifically, the first index with value "17" gets position 0, as that index is the oldest unique index, the first index with value "13" gets position 1, as that index is the next-oldest unique index, the first index with value "71" gets position 2, "51" gets 3, and "80" gets 4.

The input assembler stage 302 examines the first reset index (indicated as "R") and determines that since that index is a reset index, that index is marked as not unique and includes a special no-position value (marked with "-"). The input assembler next examines the second index with value "80" and compares that index to the indices in the reuse depth sliding window 503 for that index. The input assembler stage 302 determines that the first index with value "80" matches the second index with value "80." The input assembler stage 302 therefore does not mark the second index as unique. Additionally, the input assembler stage 302 marks the position value for the second index with value "80" as the same position value for the first index with value "80"—namely—4.

The input assembler stage 302 analyzes the remaining indices in chunk 1 502(1). The first indices with values "10" and "11" do not match any indices in the reuse depth sliding windows 503 and are thus marked unique and assigned position values 5 and 6, respectively. The second index with value "51" matches the first index with value "51" and is thus marked non-unique and given the position value of the first index with value "51", which is 3. At this point, all indices in chunk 1 502(1) have been examined.

The input assembler stage 302 outputs the indices of the chunk 1 502(1) for processing by the vertex shader stage 303 in the order indicated in the position buffer 506(1), skipping position values already seen. More specifically, the input assembler stage 302 sends the first indices with values 17, 13, 71, 51, 80, 10, and 11, in order, as shown. In some examples, the input assembler stage 302 performs these operations with a monotonically increasing counter and a comparator. The input assembler stage 302 examines the position buffer 506 consecutively, starting with the oldest index and proceeding towards the newest index. The counter starts at 0. The input assembler stage 302 attempts to find a match for the counter, and, responsive to the input assembler stage 302 finding a match, identifies the corresponding index in the corresponding chunk 502 as the next index to transmit to the vertex shader. After a match, the input assembler stage 302 increases the counter by 1 and repeats these steps, attempting to find a match. Applying this to the position buffer 506(1), the input assembler stage 302 starts at 0, finds a match, and identifies the index with value 17 for transmission to the vertex shader for processing and increases the counter by 1 to 1. The input assembler stage 302 identifies first indices with values 13, 71, 51, and 80 for transmission to the vertex shader, skips the no-position value and the second position value 4, identifies the first index with value 10, skips the second position value 3, and then identifies the first index with value 11 for transmission to the vertex shader. The input assembler stage 302 transmits the identified indices from chunk 1 502(1) to the vertex shader 303 for processing.

FIG. 5B illustrates a state in which chunk 2 502(2), which is immediately subsequent to chunk 1 502(1), is processed to identify duplicate indices, according to an example.

Chunk 1 502(1) from FIG. 5A is shown immediately prior to chunk 2 502(2). The uniqueness array 504(1) for chunk 1 502(1) is also shown and is the same as shown in FIG. 5A. The position buffer 506(1) for chunk 1 502(1) is different than what is shown in FIG. 5A, due to the way position buffers 506 work.

More specifically, the input assembler stage 302 assigns position values in the position buffer 506(2) to each of the indices in chunk 1 502(1). To assign these position values, the input assembler stage 302 begins with the newest unique index in chunk 1 502(1). The input assembler stage 302 assigns a position value of "−1" to the newest unique index in chunk 1 502(1). The input assembler stage 302 finds the next newest unique index in chunk 1 502(1) and assigns a position value of "−2" to that next newest unique index. The input assembler stage 302 continues towards older indices in chunk 1 502(1), marking each encountered unique index with a monotonically decreasing position value. Non-unique indices are assigned a special "no-position" value indicated with a "-" in FIGS. 5A and 5B.

For the indices illustrated in chunk 1 502(1), the input assembler stage 302 assigns position value "−1" to the newest index with value 11 and "−2" to the newest index with value 10 (the index with value 51 is assigned a no-position value because that index is not unique). The input assembler stage 302 assigns "−3" to the second-newest index with value 80. Note that although there are two indices with value 80 in chunk 1 502(1), the newest such index receives a no-position value because that index is not unique. The unique index with value 80 does get a position value, however, because that index is unique. Similarly, the second-newest index with value 51 gets a position value of "−4," because that index is unique. The other indices in chunk 1 502(1) have values 71, 13, and 17, and are all unique. Thus, those indices get position values −5, −6, and −7, respectively.

In chunk 2 502(2), the input assembler stage 302 examines the first index with value 80, comparing that index to the indices in the reuse depth. The input assembler stage 302 examines, in order, the indices having values R and then 80 in chunk 1 502(1), and determines that the index with value 80 in chunk 1 502(1) matches the first index with value 80 in chunk 2 502(2) but is not marked as unique and therefore continues searching through the reuse depth sliding window 503. The input assembler stage examines the other indices in the reuse depth sliding window 503, including indices with value 10, 51, and 11, and determines no match occurs with a unique index. In response to finding no index that matches the first index with value 80 in the reuse depth sliding window 503, the input assembler stage 302 marks the first index with value 80 as unique and records, as position value for that index, the next available consecutive position value starting at 0 (in this case, 0).

The input assembler stage 302 examines the first index with value 51 and determines that no index in the reuse depth sliding window 503 matches that index. In response, the input assembler stage 302 marks that index as unique and assigns the next consecutive available position value ("1") to that index. The input assembler performs the same operation with the first index having value 27 in chunk 2 502(2), marking that index as unique and assigning position value "2" to that index.

The input assembler stage 302 examines the first index with value 11 and determines that an index with value 11 exists in the reuse depth sliding window 503. The input assembler stage 302 also determines, because that index is in the previous chunk and is unique, that a match occurs. In response, the input assembler stage 302 assigns the position value of the unique index with value 11 in the reuse depth sliding window 503—"-1"—to the first index with value 11 in chunk 2 502(2) and marks that chunk as non-unique.

The next index is the first index with value 40. No match exists within the reuse depth sliding window 503, so that index is marked as unique and assigned the next consecutive available position value ("3"). The second index with value 80 matches the first index with value 80, so the second index with value 80 is marked as non-unique and is assigned the position value of the first index with value 80 ("0"). The first indices with values 16, 4, and 27, respectively, do not match any of the indices in their respective reuse depth sliding windows 503 and thus are assigned next consecutive position values and marked unique. The third index with value 80 matches the second index with value 80. Thus, the third index with value 80 is marked as non-unique and is assigned the position value of the second index with value 80 ("0"—also the position value of the first index with value 80).

The input assembler stage 302 transmits the unique indices in chunk 2 502(2) to the vertex shader stage 303 for vertex shader operations. In some examples, this transmission includes an indication (either explicit or implicit) of the order of those indices, which is based on the position values 508(2) of the indices 510(2). Thus, the input assembler stage 302 transmits the indices in the following order: 80, 51, 27, 40, 16, 4, 27. In transmitting the indices to the vertex shader stage 303, the input assembler stage 302 begins with index 0 and increases. Indices with negative numbers (and thus from the previous chunk) are not transmitted as those indices were already transmitted when that chunk was analyzed.

A method for removing duplicate indices from a chunk of indices is provided. The method includes determining, for a plurality of indices in the chunk of indices, whether the indices in the plurality of indices match indices in reuse depth sliding windows associated with the indices of the plurality of indices. The method also includes, for each index of the plurality of indices: if the index matches an index in the respective reuse depth sliding window, then marking the index as non-unique and assigning, as a position value for the index, a position value of the matching index in the reuse depth sliding window, or if the index does not match an index in the reuse depth sliding window, then marking the index as unique and assigning, as a position value for the index, a next available monotonically increasing position value for unique indices of the chunk of indices. The method further includes transmitting the indices marked as unique to a vertex shader stage of a graphics processing pipeline for vertex shading, according to the order indicated by the position values.

An accelerated processing device is also provided. The accelerated processing device includes a vertex shader stage configured to perform vertex shading based on information specified by indices and an input assembler stage. The input assembler stage is configured to determine, for a plurality of indices in a chunk of indices, whether the indices in the plurality of indices match indices in reuse depth sliding windows associated with the indices of the plurality of indices. The input assembler stage is also configured to for each index of the plurality of indices: if the index matches an index in the respective reuse depth sliding window, then mark the index as non-unique and assign, as a position value for the index, a position value of the matching index in the reuse depth sliding window, or if the index does not match an index in the reuse depth sliding window, then mark the index as unique and assign, as a position value for the index, a next available monotonically increasing position value for unique indices of the chunk of indices. The input assembler stage is also configured to transmit the indices marked as unique to the vertex shader stage for vertex shading, according to the order indicated by the position values.

A computing device is also provided. The computing device includes an accelerated processing device and a processing unit configured to transmit indices to the accelerated processing device for processing. The accelerated processing device includes a vertex shader stage configured to perform vertex shading based on information specified by indices and an input assembler stage. The input assembler stage is configured to obtain a chunk of indices from the indices transmitted by the processing unit. The input assembler stage is also configured to determine, for a plurality of indices in a chunk of indices, whether the indices in the plurality of indices match indices in reuse depth sliding windows associated with the indices of the plurality of indices. The input assembler stage is also configured to for each index of the plurality of indices: if the index matches an index in the respective reuse depth sliding window, then mark the index as non-unique and assign, as a position value for the index, a position value of the matching index in the reuse depth sliding window, or if the index does not match an index in the reuse depth sliding window, then mark the index as unique and assign, as a position value for the index, a next available monotonically increasing position value for unique indices of the chunk of indices. The input assembler stage is also configured to transmit the indices marked as unique to the vertex shader stage for vertex shading, according to the order indicated by the position values.

In some examples, the input assembler stage 302 uses the position values in the position buffer to identify primitives, instead of using the indices in the chunk 502 of indices. More specifically, part of the function of the input assembler stage 302 is to identify primitives out of a sequence of indices. This identification is based on the primitive topology, which describes the type of primitive, as well as the position of reset indices. There are many primitive topologies, such as line list, line strip, triangle list, triangle strip, and the like (list means sequential, non-overlapping indices form primitives and strip means sequential overlapping indices form primitives). If the position values are defined with a smaller number of bits than indices, then identifying primitives from the position values in the position buffers 506 requires less circuit elements (wires, logic gates, or the like).

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for removing duplicate indices from a stream of indices for processing by a graphics pipeline, the method comprising:
    identifying a chunk of indices from within the stream, wherein each index in the stream of indices comprises a reference to a graphics vertex stored in a vertex buffer;
    determining, for each index of a plurality of indices in the chunk of indices, whether the index of the plurality of indices matches an index in a reuse depth sliding window associated with the index of the plurality of indices;
    for each index of the plurality of indices:
        if the index matches an index in the respective reuse depth sliding window, then marking the index as non-unique and assigning, as a position value for the index, a position value of the matching index in the reuse depth sliding window, or
        if the index does not match an index in the respective reuse depth sliding window, then marking the index as unique and assigning, as a position value for the index, a next available monotonically increasing position value for unique indices of the chunk of indices; and
    transmitting the indices marked as unique, but not the indices marked as non-unique, to a vertex shader stage of a graphics processing pipeline for vertex shading, according to the order indicated by the position values.

2. The method of claim 1, wherein position values begin at 0 for the first unique index of the chunk of indices and increase monotonically for each other unique index in the chunk of indices.

3. The method of claim 2, wherein position values for indices in a chunk of indices immediately prior to the chunk of indices begin at −1 for the newest unique index in the immediately prior chunk and decrease monotonically for each next newest unique index in the immediately prior chunk.

4. The method of claim 1, wherein:
    an index in the chunk of indices matches with another index in the reuse depth sliding window if the other index in the reuse depth sliding window is in the chunk of indices and has the same index value as the index; and
    an index in the chunk of indices does not match with another index in the reuse depth sliding window if the other index in the reuse depth sliding window does not have the same index value as the index.

5. The method of claim 4, wherein:
    an index in the chunk matches an index in the respective reuse depth sliding window that is in a chunk immediately prior to the chunk of indices if the index in the reuse depth sliding window is marked as unique and has the same index value as the index; and
    an index in the chunk does not match an index in the respective reuse depth sliding window that is in the chunk immediately prior to the chunk of indices if the index in the reuse depth sliding window is not marked as unique.

6. The method of claim 1, wherein:
    indices in the chunk of indices do not match with reset indices.

7. The method of claim 1, wherein:
    the chunk of indices comprises a first chunk of indices examined; and
    indices in the sliding window within a chunk that is immediately prior to the chunk of indices all comprise a reset index, so that an index of the first chunk of indices never matches indices in the sliding window within the chunk that is immediately prior to the chunk of indices.

8. The method of claim 1, wherein:
    the reuse depth sliding window comprises consecutive indices immediately prior to an index of the plurality of indices that is associated with the reuse depth sliding window.

9. The method of claim 1, further comprising:
    selecting a second chunk of indices for analysis, the second chunk of indices being immediately subsequent to the chunk of indices;
    determining, for a second plurality of indices in the second chunk of indices, whether the indices in the second plurality of indices match indices in reuse depth sliding windows associated with the indices of the plurality of indices;
    for each index of the second plurality of indices:
        if the index matches an index in the respective reuse depth sliding window, then marking the index as non-unique and assigning, as a position value for the index, a position value of the matching index in the reuse depth sliding window, or
        if the index does not match an index in the reuse depth sliding window, then marking the index as unique and assigning, as a position value for the index, a next available monotonically increasing position value for unique indices of the chunk of indices; and
    transmitting the indices marked as unique to a vertex shader stage of a graphics processing pipeline for vertex shading, according to the order indicated by the position values.

10. An accelerated processing device, comprising:
a vertex shader stage configured to perform vertex shading based on information specified by a stream of indices for processing by a graphics processing pipeline, wherein each index in the stream of indices comprises a reference to a graphics vertex stored in a vertex buffer; and
an input assembler stage of the graphics processing pipeline, the input assembler stage configured to:
  identify a chunk of indices from within the stream, wherein each index in the stream of indices comprises a reference to a graphics vertex stored in a vertex buffer;
  determine, for each index of a plurality of indices in a chunk of indices, whether the index of the plurality of indices matches an index in a reuse depth sliding window associated with the index of the plurality of indices;
  for each index of the plurality of indices:
    if the index matches an index in the respective reuse depth sliding window, then mark the index as non-unique and assign, as a position value for the index, a position value of the matching index in the reuse depth sliding window, or
    if the index does not match an index in the respective reuse depth sliding window, then mark the index as unique and assign, as a position value for the index, a next available monotonically increasing position value for unique indices of the chunk of indices; and
  transmit the indices marked as unique, but not the indices marked as non-unique, to the vertex shader stage for vertex shading, according to the order indicated by the position values.

11. The accelerated processing device of claim 10, wherein position values begin at 0 for the first unique index of the chunk of indices and increase monotonically for each other unique index in the chunk of indices.

12. The accelerated processing device of claim 11, wherein position values for indices in a chunk of indices immediately prior to the chunk of indices begin at −1 for the newest unique index in the immediately prior chunk and decrease monotonically for each next newest unique index in the immediately prior chunk.

13. The accelerated processing device of claim 10, wherein:
an index in the chunk of indices matches with another index in the reuse depth sliding window if the other index in the reuse depth sliding window is in the chunk of indices and has the same index value as the index; and
an index in the chunk of indices does not match with another index in the reuse depth sliding window if the other index in the reuse depth sliding window does not have the same index value as the index.

14. The accelerated processing device of claim 13, wherein:
an index in the chunk matches an index in the respective reuse depth sliding window that is in a chunk immediately prior to the chunk of indices if the index in the reuse depth sliding window is marked as unique and has the same index value as the index; and
an index in the chunk does not match an index in the respective reuse depth sliding window that is in the chunk immediately prior to the chunk of indices if the index in the reuse depth sliding window is not marked as unique.

15. The accelerated processing device of claim 10, wherein:
indices in the chunk of indices do not match with reset indices.

16. The accelerated processing device of claim 10, wherein:
the chunk of indices comprises a first chunk of indices examined; and
indices in the sliding window within a chunk that is immediately prior to the chunk of indices all comprise a reset index, so that an index of the first chunk of indices never matches indices in the sliding window within the chunk that is immediately prior to the chunk of indices.

17. The accelerated processing device of claim 10, wherein:
the reuse depth sliding window comprises consecutive indices immediately prior to an index of the plurality of indices that is associated with the reuse depth sliding window.

18. The accelerated processing device of claim 10, wherein the input assembler stage is further configured to:
select a second chunk of indices for analysis, the second chunk of indices being immediately subsequent to the chunk of indices;
determine, for a second plurality of indices in the second chunk of indices, whether the indices in the second plurality of indices match indices in reuse depth sliding windows associated with the indices of the plurality of indices;
for each index of the second plurality of indices:
  if the index matches an index in the respective reuse depth sliding window, then mark the index as non-unique and assign, as a position value for the index, a position value of the matching index in the reuse depth sliding window, or
  if the index does not match an index in the reuse depth sliding window, then mark the index as unique and assign, as a position value for the index, a next available monotonically increasing position value for unique indices of the chunk of indices; and
transmit the indices marked as unique to a vertex shader stage of a graphics processing pipeline for vertex shading, according to the order indicated by the position values.

19. A computing device, comprising:
an accelerated processing device comprising:
  a vertex shader stage configured to perform vertex shading based on information specified by a stream of indices for processing by a graphics processing pipeline, wherein each index in the stream of indices comprises a reference to a graphics vertex stored in a vertex buffer; and
  an input assembler stage of the graphics processing pipeline;
a processing unit configured to transmit the stream of indices to the accelerated processing device for processing,
wherein the input assembler stage is configured to:
  identify a chunk of indices from within the stream of indices transmitted by the processing unit, wherein each index in the stream of indices comprises a reference to a graphics vertex stored in a vertex buffer;
  determine, for each index of a plurality of indices in the chunk of indices, whether the index of the plurality of indices matches an index in a reuse depth sliding window associated with the index of the plurality of indices;

for each index of the plurality of indices:
- if the index matches an index in the respective reuse depth sliding window, then mark the index as non-unique and assign, as a position value for the index, a position value of the matching index in the reuse depth sliding window, or
- if the index does not match an index in the respective reuse depth sliding window, then mark the index as unique and assign, as a position value for the index, a next available monotonically increasing position value for unique indices of the chunk of indices; and transmit the indices marked as unique, but not the indices marked as non-unique, to the vertex shader stage for vertex shading, according to the order indicated by the position values.

20. The computing device of claim 19, wherein:
- an index in the chunk of indices matches with another index in the reuse depth sliding window if the other index in the reuse depth sliding window is in the chunk of indices and has the same index value as the index;
- an index in the chunk of indices does not match with another index in the reuse depth sliding window if the other index in the reuse depth sliding window does not have the same index value as the index;
- an index in the chunk matches an index in the respective reuse depth sliding window that is in a chunk immediately prior to the chunk of indices if the index in the reuse depth sliding window is marked as unique and has the same index value as the index; and
- an index in the chunk does not match an index in the respective reuse depth sliding window that is in the chunk immediately prior to the chunk of indices if the index in the reuse depth sliding window is not marked as unique.

* * * * *